United States Patent [19]
Horiuchi

[11] Patent Number: 5,754,461
[45] Date of Patent: May 19, 1998

[54] ARITHMETIC PROCESSING METHOD

[75] Inventor: Yoshio Horiuchi, Hiratsuka, Japan

[73] Assignee: International Business Machines Corporation, Armonk, N.Y.

[21] Appl. No.: 778,328

[22] Filed: Jan. 2, 1997

[30] Foreign Application Priority Data

Feb. 7, 1996 [JP] Japan ................................. 8-021001

[51] Int. Cl.⁶ ............................................................ G06F 7/50
[52] U.S. Cl. .................................................... 364/786.04
[58] Field of Search ................ 364/DIG. 1 MS File, 364/DIG. 2 MS File, 736, 751, 768, 769, 770, 771, 772, 773, 774, 775, 776, 777, 778, 779, 780, 781, 782, 783, 785, 786.01, 788, 784.01, 786.04, 786.03

[56] References Cited

U.S. PATENT DOCUMENTS

| | | | |
|---|---|---|---|
| 5,210,711 | 5/1993 | Rossmere et al. | 364/786.04 |
| 5,426,743 | 6/1995 | Phillips et al. | 395/562 |
| 5,490,100 | 2/1996 | Kableshkoy | 364/786.04 |

*Primary Examiner*—Robert B. Harrell
*Attorney, Agent, or Firm*—Daniel E. McConnell

[57] ABSTRACT

An arithmetic processing method by which a logic unit having registers composed of a k m bit length is employed to quickly and efficiently perform arithmetic operations, including subtractions performed many times between elements composed of k unsigned bits.

3 Claims, 4 Drawing Sheets

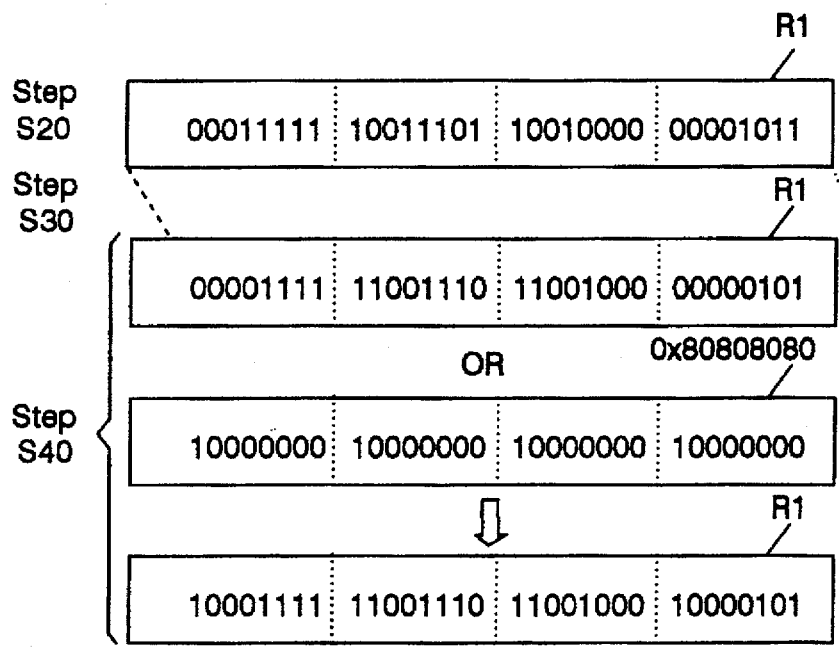
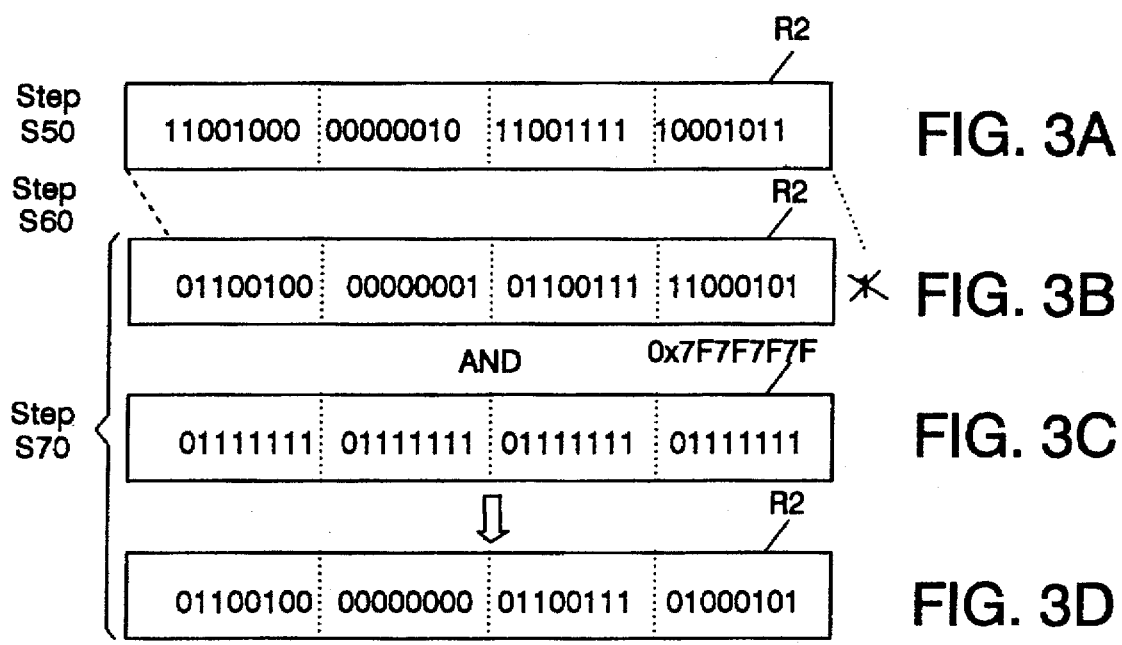

FIG. 4A

| 10001111 | 11001110 | 11001000 | 10000101 | R1 |
|---|---|---|---|---|
| $a'_i$ | $a'_{i+1}$ | $a'_{i+2}$ | $a'_{i+3}$ | |

FIG. 4B

| 01100100 | 00000001 | 01100111 | 01000101 | R2 |
|---|---|---|---|---|
| $b'_i$ | $b'_{i+1}$ | $b'_{i+2}$ | $b'_{i+3}$ | |

FIG. 4C

| 00101011 | 11001101 | 01100001 | 01000000 |
|---|---|---|---|
| $C_0(=43)$ | $C_1(=205)$ | $C_2(=97)$ | $C_3(=64)$ |

FIG. 6A

First register (R1)
| $a_i$ (=31) | $a_{i+1}$ (=157) | $a_{i+2}$ (=144) | $a_{i+3}$ (=11) |
|---|---|---|---|

Second register (R2)
| $b_i$ (=200) | $b_{i+1}$ (=2) | $b_{i+2}$ (=207) | $b_{i+3}$ (=139) |
|---|---|---|---|

FIG. 6B

First register (R1)
| 00011111 | 10011101 | 10010000 | 00001011 |
|---|---|---|---|
| (=3) | (=157) | (=144) | (=11) |

Second register (R2)
| 11001000 | 00000010 | 11001111 | 10001011 |
|---|---|---|---|
| (=200) | (=2) | (=207) | (=139) |

ARITHMETIC PROCESSING METHOD

BACKGROUND OF THE INVENTION

The present invention relates to an arithmetic processing method for employing a computer system to perform arithmetic operations, to include the four fundamental arithmetic operations, and in particular to an arithmetic processing method for rapidly and efficiently performing calculations that involve an enormous amount of repetitive subtraction. More specifically, the present invention relates to a method by which an arithmetic logic unit, which has k×m bit length registers, is employed to quickly and efficiently perform arithmetic operations in which the subtraction of elements consisting of k unsigned bits is performed multiple times.

In accordance with recent technical developments, various types of computer systems, such as personal computers and workstations, have been produced and are being widely employed.

These computer systems are sometimes employed for processing, such as for graphics, that requires a great number of calculations. Especially, the compression and decompression of color motion pictures includes an enormous number of calculations.

According to a method for compressing color motion pictures that conforms to MPEG (Motion Picture Experts Group) 1, which is one of the popular compression and decompression methods used for color motion pictures, temporal compression is performed based on motion compensation, i.e., the prediction of motion between frames. According to the principle of "prediction of motion between frames by motion compensation", correlation between the frames of motion pictures (or between the fields) is employed to calculate the motion of an image between a current frame and the preceding frame. Based on the calculated motion, an image of a current frame is predicted, a predictive difference between the current and the preceding frame is calculated, and the predictive difference information and motion information are coded. A method called "block matching" is known as a method for calculating the motion of an image between frames. For the block matching method, for example, a 16 pixel square in a frame is defined as one macro block, and macro block is handled as a vector consisting of 256(=16×16) elements. The macro blocks having a shorter vector distance between each other are regarded as "similar".

As is well known in the geometrical field, the Euclidean space between two vectors $A(a_0, a_1, a_2, \ldots, a_{N-2}, a_{N-1})$ and $B(b_0, b_1, b_2, \ldots, b_{N-2}, b_{N-1})$ in the N dimensional Euclidean space is defined by the following Expression (1).

$$|AB| = \sqrt{\sum_{i=0}^{N} (a_i - b_i)^2}$$ [Expression 1]

OR $$|AB|^2 = \sum_{i=0}^{N} (a_i - b_i)^2$$

A vector consists of 256 elements, for example, and each element is represented by an 8-bit value (i.e., an unsigned eight bit binary digit). Therefore, in the Expression (1), individual elements $a_0, a_1, \ldots$ and $b_0, b_1, \ldots$ are character or "char" form data, i.e., unsigned binary data having an eight bit length. To calculate a distance between the two vectors A and B, subtraction $(a_i - b_i)$ for data represented with 8 bits (=1 byte) is repeated at least 256 (=N) times (it should be noted that i is an integer of $0 \leq i \leq 255$).

In a computer system, a CPU, which is a main controller, handles almost all the arithmetic operations including the four fundamental arithmetic operations. The arithmetic processing is normally performed by the CPU by loading data on its registers (registers are memory elements of the CPU that can be accessed at high speed). Instructions and processed data extracted from the memory are temporarily stored in the registers. The individual logic units of the CPU access the registers, perform predetermined arithmetic operations, and return the operational results to the registers. CPU includes, as one of the logic units, an arithmetic and logic unit (ALU), that is responsible for calculation of integers and logical operations (AND, OR, NOT, etc.), and a floating-point unit (FPU), that is responsible for floating point calculations. Ordinarily, these operation units have a plurality of dedicated registers. In other words, the individual logic units are capable of performing logic operations by units of a register width. Recently, as the power of a CPU has been increased, the bit width of an input/output register of a CPU has likewise been increased. In the CPU chip "PowerPC 601" ("PowerPC" is a trademark of IBM Corp.) of RISC (Reduced Instruction Set Computer) type, jointly developed by IBM corp., Motorola Corp. and Apple Computer, Inc., or in the CPU chip "Pentium" (a trademark of Intel Corporation), produced by Intel Corp., for example, the registers of the ALU have a long form, i.e., have a length of 32 bits (=4 bytes). (In a PowerPC, almost all instructions are executed by accessing only registers, and only some instructions are executed, such as for loading or for storing, by directly accessing memory. In addition, for the instructions such as addition, subtraction and other logical operations, the process is completed within only one cycle, including the storing the results in the register. Other RISC CPUs are similar.) Some CPUs used into workstations have larger registers that employ a long—long form, i.e., have a length of 64 bits. By using such a long register, CPU can fetch a great amount of data at one time, and can process the data at high speed by using the great power it possesses.

The amount of calculation performed by the CPU to acquire a vector distance for motion compensation will be briefly considered. Each element of a vector is represented by an unsigned 8 bit value (i.e., an eight bit binary system digit). Therefore, for one calculation of a vector distance, 256 subtractions times that are equivalent to the number of the elements are performed. Further, to simply scan an entire screen to search for one motion vector, the calculation of a vector distance must be performed over 20,000 times. (For example, a CIF (Common Intermediate Format) screen, which is a typical image format. The CIF screen size is 176×144 pels.) Although, some attempts can be taken, such as reducing the scope of a range to be scanned or increasing the efficiency of a scanning method, the consumption of the CPU's resources is still great.

When each element of the vector has a char form, i.e., an 8 bit length, the values for four elements can be written into a register having a long form, i.e. a 32 bit length, at one time. Since the arithmetic processes are performed at higher speeds as the amount of data to be written each time is increased, the resources of the CPU can be released. However, the CPU can handle a 32 bit value, written in its own register, only as a single value consisting of 32 bits. In other words, even if data for individual bytes are simultaneously written in a four byte register, the boundaries between bytes on a 32 bit register can not be distinguished when an arithmetic process is to be performed.

To perform four sets of subtractions; $a_i - b_i$, $a_{i+1} - b_{i+1}$, $a_{i+2} - b_{i+2}$, and $a_{i+3} - b_{i+3}$, four minuends $a_i$, $a_{i+1}$, $a_{i+2}$, and $a_{i+3}$, can be written at the same time in the first register in the ALU, while four subtrahends $b_i$, $b_{i+1}$, $b_{i+2}$, and $b_{i+3}$, can be written at the same time in the second register in the ALU (see FIG. 6(a)). It is desirable that, by such simultaneous writing, four sets of subtractions can be performed at one time by one input/output operation relative the register. However, when the four sets of subtractions are performed, the ALU handles the value held in each 32-bit register as a single value. In other words, although in actuality the four sets of minuends and of subtrahends are written in the first and the second registers of the ALU respectively, the boundaries between the respective minuends and the respective subtrahends in the registers (indicated by the broken lines in FIG. 6) can not be distinguished by the ALU. In other words, the boundaries between the individual bytes are not maintained. As a result, when the value of a subtrahend is greater than that of a minuend (e.g., the third and the fourth bytes from the upper level in the registers shown in FIG. 6), the ALU borrows one from the higher byte to the left. Since independent data are written in each byte of the register, however, the borrowing of one from the next higher byte causes a calculation error.

It is not rare in the subtraction process of integers for a subtrahend to be greater than a minuend (i.e., to require the borrowing of one from the next higher number). Thus, when the four sets of subtrahends and minuends are written at the same time while only the bit length of the register of the ALU is taken into consideration, the process whereby one is borrowed from the next higher byte must be performed, and the boundaries between the bytes are not maintained. In order to prevent an error due to the borrowing of one from the next higher byte, a simple and easy solution is to sequentially input one set of a subtrahend and a minuend to the register of the ALU, i.e., to perform only one subtraction by a single input/output of the register. However, for a register having a 32 bit length to be used to perform an arithmetic operation for elements composed of only 8 bit is not efficient.

SUMMARY OF THE INVENTION

It is one purpose of the present invention to provide an excellent arithmetic processing method for performing arithmetic operations, to include the four fundamental arithmetic operations, by using a computer system.

It is another purpose of the present invention to provide an excellent arithmetic processing method for quickly and efficiently performing arithmetic operations that include an enormous amount of repetitive subtractions.

It is an additional purpose of the present invention to provide an excellent arithmetic processing method by which an logic unit having registers composed of k m bit length is employed to quickly and efficiently perform arithmetic operations, including subtractions, performed many times between elements composed of k unsigned bits.

In achieving the purposes of the present invention, according to a first aspect, method is practiced for performing arithmetic operations, including subtractions between data elements composed of unsigned k bits repeated at least N times, by using a logic unit that has one or more registers composed of k×m bit length (k, m and N are positive integers and N≧m), which comprises the steps of:

(a) writing m minuends to the respective k bits of a first register of the logic unit;

(b) shifting the first register one bit to a lower position;

(c) providing a "1" on the most significant bit position of the respective k bits of the first register;

(d) writing m subtrahends to the respective k bits of a second register of the logic unit;

(e) shifting the second register one bit to a lower position;

(f) providing a "0" on the least significant bit position of the respective k bits of the second register;

(g) subtracting contents of the second register, obtained at the step (f), from contents of the first register, obtained at the step (c), and writing the result into a third register of the logic unit;

(h) extracting the result by k bits from the upper portion of the third register obtained at the step (g); and (l) employing a value indicated by the k bits extracted at the step (h) as the address for referring to a table prepared in advance, and regarding the result obtained by referring to the table as a k-bit result obtained by subtracting one of the subtrahends from the corresponding minuends.

According to a second aspect of the present invention, a method is practiced for performing arithmetic operations, including subtractions between data composed of unsigned 8 bits (=1 byte) that are repeated at least N times (N is a positive integer and N>4), by using a logic unit that has one or more registers composed of 32 bit (=4 bytes) lengths, which comprises the steps of:

(a) writing four minuends to the respective bytes of a first register of the logic unit;

(b) shifting the first register one bit to a lower position;

(c) providing a "1" on the most significant bit of the respective bytes of the first register;

(d) writing four subtrahends to the respective bytes of a second register of the logic unit;

(e) shifting the second register one bit to a lower position;

(f) providing a "0" for the least significant bit of the respective bytes of the second register;

(g) subtracting contents of the second register, obtained at the step (f), from contents of the first register, obtained at the step (c), and writing the result into a third register of the logic unit;

(h) extracting the result by one byte from the upper portion of the third register obtained at the step (g); and (l) employing a value indicated by the byte extracted at the step (h) as the address for referring to a table prepared in advance, and regarding the result obtained by referring to the table as a one byte result obtained by subtracting one of the subtrahends from the corresponding minuends.

According to a third aspect of the present invention, a method is practiced for performing arithmetic operations, including subtractions between elements composed of unsigned 8 bits (=1 byte) that are repeated N times ($a_i-b_i$; i is a positive integer of 0 to N−1) (N is a positive integer and N≧4), by using a logic unit that has one or more registers composed of 32 bit (=4 bytes) lengths, which comprises the steps of:

(a) writing four minuends, $a_i$, $a_{i+1}$, $a_{i+2}$ and $a_{i+3}$, to the respective bytes of a first register of the logic unit;

(b) shifting the first register one bit to a lower position;

(c) providing a "1" on the most significant bit of the respective bytes of the first register to acquire $a'_i$, $a'_{i+1}$, $a'_{i+2}$ and $a'_{i+3}$;

(d) writing four subtrahends, $b_i$, $b_{i+1}$, $b_{i+2}$ and $b_{i+3}$, to the respective bytes of a second register of the logic unit;

(e) shifting the second register one bit to a lower position;

(f) providing a "0" on the least significant bit of the respective bytes of the second register so that the resultant data $b'_i$, $b'_{i+1}$, $b'_{i+2}$ and $b'_{i+3}$ are stored in the respective bytes;

(g) subtracting contents, $b'_i$, $b'_{i+1}$, $b'_{i+2}$ and $b'_{i+3}$, of the second register, obtained at the step (f), from contents, $a'_i$, $a'_{i+1}$, $a'_{i+2}$ and $a'_{i+3}$, of the first register, obtained at the step (c), and writing a difference $c_j(=a'_{i+j}-b'_{i+j}$; j is a positive integer of 0 to 3) of the respective bytes into the respective bytes of a third register of the logic unit;

(h) extracting the result $c_j$ respectively from the upper portion of the third register; and (l) referring to a field addressed by the value $c_j$ in a table prepared in advance, so that a value stored in the field is employed as a result obtained by subtracting the subtrahend $b_{i+j}$ from the minuend $a_{i+j}$.

BRIEF DESCRIPTION OF THE DRAWINGS

Some of the purposes of the invention having been stated, others will appear as the description proceeds, when taken in connection with the accompanying drawings, in which:

FIGS. 2A, 2B, 2C, and 2D are diagrams showing the contents of a first register (R1) of an ALU for the individual steps, or more specifically, showing the condition of the data loaded into the register R1 at step S20 as they are processed at steps S30 and S40.

FIGS. 3A, 3B, 3C, and 3D are diagrams showing the contents of a second register (R2) of an ALU for the individual steps, or more specifically, showing the condition of the data loaded in the register R2 at step S50 as they are processed at steps S60 and S70.

FIGS. 4A, 4B, and 4C are diagrams showing the contents of the first register (R1), the second register (R2) and the third register (R3) of the ALU for the individual steps, or more specifically, showing the conditions of the registers R1, R2 and R3 at step S80.

FIGS. 6(a) and 6(b) are diagrams showing the condition of the four minuends $a_i$, $a_{i+1}$, $a_{i+2}$ and $a_{i+3}$ written at the same time in the first register of the ALU, and the condition of the four subtrahends $b_i$, $b_{i+1}$, $b_{i+2}$ and $b_{i+3}$ written at the same time in the second register of the ALU.

DESCRIPTION OF THE PREFERRED EMBODIMENT(S)

Figure 1:
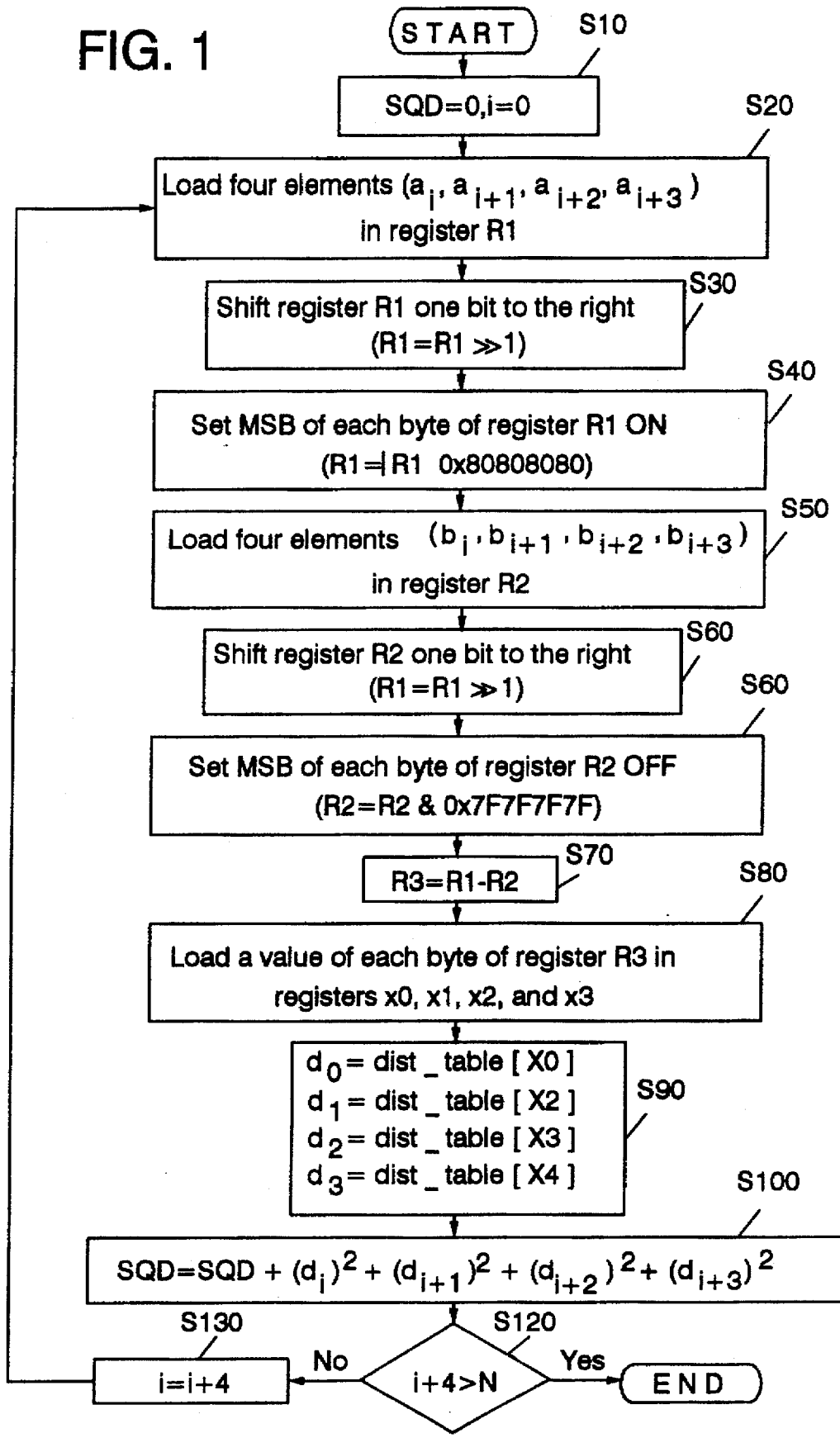
FIG. 1 is a flowchart showing an arithmetic processing method according to one embodiment of the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The operation of the present invention will be schematically described by employing a case wherein an ALU having registers composed of 32 bit length performs subtractions for 8-bit elements N times ($a_i-b_i$; i is a positive integer of 0 to N−1, and N≧4).

First, four minuends, $a_i$, $a_{i+1}$, $a_{i+2}$ and $a_{i+3}$, are written in the first register of the ALU, and four subtrahends, $b_i$, $b_{i+1}$, $b_{i+2}$ and $b_{i+3}$, are written in the second register of the ALU. If ($a_i$, $a_{i+1}$, $a_{i+2}$, $a_{i+3}$)=(31, 157, 144, 11) and ($b_i$, $b_{i+1}$, $b_{i+2}$, $b_{i+3}$)=(200, 2, 207, 239), the binary values of the individual elements are written in the respective registers as is shown in FIGS. 2(a) and 3(a).

Then, the first register is shifted one bit to a lower position, i.e., to the right, and a "1" is provided on the most significant bit position of the respective bytes in the first register. As a result, each byte of the first register has its least significant bit deleted, i.e., erased, and is shifted one bit to the lower position, and thus, a "1" is provided for the most significant bit of the respective bytes. When, for example, the binary representation of $a_i$ stored in one byte from the upper first byte is "00011111", $a'_i$ will be "10001111" after the shift. When the binary representation "10011101" of $a_{i+1}$ is stored in the second byte, $a'_{i+1}$ becomes "11001110". A "1" is provided for the most significant bit position of the respective minuends so that the borrowing of one from the next higher byte is prevented from occurring at a succeeding subtraction process. Accordingly, the boundaries between the individual bytes are preserved.

Further, the second register is shifted one bit to a lower position, i.e., to the right, and a "0" is provided on the least significant bit position of the respective bytes of the second register. As a result, each byte of the second register has its least significant bit deleted, i.e., erased, and is shifted one bit to the lower position, and thus, a "0" is provided on the most significant bit of the respective bytes. When, for example, the binary representation of $b_i$ stored in one byte from the upper first byte is "11001000", $b'_i$ will be "01100100" after the shift. When the binary representation "00000010" of $b_{i+1}$ is stored in the second byte, $b'_{i+1}$ becomes "00000001". A "0" is provided on the most significant bit position of the respective subtrahends so that the borrowing of one from the next higher byte is prevented from occurring at a succeeding subtraction process. Accordingly, the boundaries between the individual bytes are preserved.

The contents of the second register are subtracted from the contents of the first register, and the result of the subtraction is written to a third register. Before this subtraction, individual bytes of the first and the second registers are shifted one bit to the lower position (to the right) by deleting the least significant bits. In addition, a "1" is provided only on each byte of the first register in order to prevent the borrowing of one from the higher number from occurring at the most significant bits. Thus, the subtraction between the first register and the second register is performed for the bytes without the borrowing of one from a higher byte. That is, in the upper j-th byte of the third register is written value $c_j(=a'_{i+j}-b'_{i+j})$, obtained by subtracting value $b'_{i+j}$ at a corresponding byte position in the second register from value $a'_{i+j}$ at a corresponding byte position in the first register (j is an integer of 0 to 3).

Values $c_0$, $c_1$, $c_2$ and $c_3$ of the individual bytes of the third register are merely simulated values, and do not themselves indicate the true results of subtractions. This would be easily understood because the least significant bits are deleted and "1" was provided for the most significant bits of the minuends. However, it should be noted that a difference between the original minuend $a_{i+j}$ and the original subtrahend $b_{i+j}$, i.e., a true subtraction result, has a correspondence with a simulated arithmetic operation result $c_j(=a'_{i+j}-b'_{i+j})$.

In the present invention, the correspondence of the two is calculated in advance and is managed in the form of a table. In one embodiment, this table is called a "distance table". When the distance table is accessed to refer to the field that corresponds to the result $c_j$, so that the true subtraction result can be obtained. For example, when the simulated result $c_j(=a'_{i+j}-b'_{i+j})$ is "00101011", i.e., 43 by the decimal system, the 43rd field in the distance table is accessed, and the true subtraction result 170 can be acquired (see Table 1). This result is greater by one than an absolute value (=169) obtained by subtracting the original subtrahend $b_i(=200)$ from the original minuend $a_i(=31)$. This is merely an error that results from the deletion of the least significant bit.

According to the arithmetic processing of the present invention, in an arithmetic operation that includes subtractions of k-bit elements repeated multiple times, m sets of elements can be transmitted at the same time to a logic unit having registers composed of k×m bit length. In other words, subtractions for m sets can be performed at one time. Therefore, according to the present invention, an enormous amount of repetitive subtractions can be performed at a high speed, and efficiently.

When, for example, a vector distance is calculated by the arithmetic processing method of the present invention, the calculation is performed every four bytes, and the number of instructions at the bottom of the loop can be reduced. Further, since a distance table is employed, the definition of a vector distance can be altered easily and without an increase in unnecessary instructions. In addition, when this definition of a vector distance is used for motion compensation, one of the vectors, e.g., vector A ($a_0, a_1, \ldots, a_{254}, a_{255}$), is fixed and can be calculated in advance during a preprocessing procedure. One part of the processing is moved out of the loop and the number of instructions can be further reduced. For example, in FIG. 1, which will be referred to later, a vector A'($a'_0, a'_1, a'_2, \ldots, a'_{254}, a'_{255}$), for which a preprocessing procedure is performed for preserving the boundaries between bytes, can be prepared in advance. In this case, at step S20, individual vector elements $a'_0, a'_1, a'_2, \ldots$, that were preprocessed, can be loaded into register R1. Therefore, the following steps S30 and S40 can be omitted.

FIG. 1 is a flowchart showing an arithmetic processing method according to one embodiment of the present invention. It is assumed that this flowchart is employed to calculate the square of the Euclid space D, $D^2(=|AB|^2)$, between two vectors A($a_0, a_1, a_2, \ldots, a_{N-2}, a_{N-1}$) and B($b_0, b_1, b_2, \ldots, b_{N-2}, b_{N-1}$), each element of which is composed of 8 bits (=1 byte). It should be noted that the elements of the vectors are unsigned 8-bit values.

At step S10, as the initial setup, "0" is substituted into SQD and index variable i. SQD represents a squared distance.

At step S20, elements ($a_i, a_{i+1}, a_{i+2}, a_{i+3}$) for four bytes, are loaded as minuends into the first register (R1) of the ALU. If (($a_i, a_{i+1}, a_{i+2}, a_{i+3}$)=(31, 157, 144, 11), a series of binary values for the elements, "00011111: 10011101: 10010000: 00001011", is written in the first register (R1). It should be noted that ":" is used to merely indicate, in this specification, the boundaries between the individual bytes the convenience sake, and does not constitute an actual entry in the register (R1). The same can be applied hereinafter. See FIG. 2(a).

At step S30, the contents of the first register (R1) are shifted down one bit to a lower position (to the right). As a result, the contents of the register (R1) is, as is shown in FIG. 2(b), "00001111: 11001110: 11001000: 00000101". This arithmetic operation is described in C language, for example, as "R1=R1>>1" which specifies a one-bit shift to the right.

At step S40, a "1" is provided for the most significant bit position of each byte in the first register (R1). As a result, the contents of the register (R1) is, as is shown in FIG. 2(d), "10001111: 11001110: 11001000: 10000101". This arithmetic operation is described in C language, for example, as "R1=R1|0x80808080". The operator "|" designates an "OR" logical operation, and "80808080" in the hexadecimal system corresponds to "10000000: 10000000: 10000000: 10000000" (see FIG. 2(c)). Therefore, the most significant bits of the individual bytes can be set to ON by acquiring a logical sum of the register R1 and the above value.

As a result, at steps S30 and S40 the contents of the first register (R1) are "10001111: 11001110: 11001000: 10000101". In other words, at steps S30 and S40, minuends having simulated values, $a'_i, a'_{i+1}, a'_{i+2}$ and $a'_{i+3}$ are generated for the respective bytes of the register R1. A "1" is set in the most significant bits of the minuends so that the borrowing of one from a higher byte will be thereby prevented at a succeeding subtraction. As a result, the separation into the individual bytes can be preserved.

At step S50, elements ($b_i, b_{i+1}, b_{i+2}, b_{i+3}$) for four bytes, are loaded as subtrahends into the second register (R2) of the ALU. If ($b_i, b_{i+1}, b_{i+2}, b_{i+3}$)=(200, 2, 207, 139), a series of binary values for the elements, "11001000: 00000010: 11001111: 10001011", is written in the second register (R2). It should be noted that ":" is used to merely indicate, in this specification, the boundaries between the individual bytes for the convenience sake, and does not constitute an actual entry in the register (R2). The same can be applied hereinafter. See FIG. 3(a).

At step S60, the contents of the second register (R2) are shifted down one bit to a lower position (to the right). As a result, the value of the register (R2) is, as is shown in FIG. 3(b), "01100100: 00000001: 01100111: 11000101". This arithmetic operation is described in C language, for example, as "R2=R2>>1" which specifies a one-bit shift to the right.

At step S70, a "0" is provided on the most significant bit position of each byte in the second register (R2). As a result, the value of the register (R2) is, as is shown in FIG. 3(d), "01100100: 00000001: 01100111: 01000101". This arithmetic operation is described in C language, for example, as "R2=R2 & 0 7F7F7F7F". The operator "&" designates an "AND" logical operation, and "7F7F7F7F" in the hexadecimal system corresponds to "01111111: 01111111: 01111111: 01111111" (see FIG. 3(c)). Therefore, the most significant bits of the individual bytes can be masked and set to OFF by acquiring a logical product of the register R2 and the above value.

As a result, at steps S60 and S70 the contents of the second register (R2) is "01100100: 00000001: 01100111: 01000101". In otherwords, at steps S60 and S70, subtrahends having simulated values, $b'_i, b'_{i+1}, b'_{i+2}$ and $b'_{i+3}$ are generated for the respective bytes of the register R2. A "0" is set on the most significant bit of the respective subtrahends so that the borrowing of one from a higher byte will be thereby prevented at a succeeding subtraction. As a result, the separation into individual bytes can be preserved.

At step S80, subtraction is performed between the first register (R1) and the second register (R2), in which four minuends and subtrahends having simulated values are respectively held, and the result is stored in the third register (R3). This process is described in C language, for example, as "R3=R1−R2". The most significant bits of the individual bytes of the first register (R1) are set to ON so as to prevent the borrowing of one from a higher number, and the most significant bits of the individual bytes of the second register (R2) are set to OFF so as to prevent the borrowing of one from a higher number (previously described). Therefore, in the subtraction performed for the register R1 and the register R2, the borrowing of one from the next higher byte does not occur. In other words, the results $c_0(=a'_i-b'_i)$, $c_1(=a'_{i+1}-b'_{i+1})$, $c_2(=a'_{i+2}-b'_{i+2})$ and $c_3(=a'_{i+3}-b'_{i+3})$, obtained by subtracting the respective bytes in the register R2 from the corresponding bytes of the register R1, are written in the corresponding bytes of the register R3. In this embodiment, the contents of the register R3 are, as is shown in FIG. 4(c), "00101011: 11001101: 01100001: 01000000". This simulated result is $(c_0, c_1, c_2, c_3)=(43, 205, 97, 64)$ in the decimal system.

At step S90, the third register (R3) into which the simulated operation result is loaded is divided into individual bytes beginning at the upper first byte, and the obtained bytes are stored respectively in registers x0, x1, x2 and x3. Then, the simulated arithmetic operation results, $c_0$, $c_1$, $c_2$ and $c_3$, are loaded into the respective registers, x0, x1, x2 and x3.

The operation results $(c_0, c_1, c_2, c_3)=(43, 205, 97, 64)$ are not yet the results that would be obtained by subtracting the original subtrahends ($b_i$, $b_{i+1}$, $b_{i+2}$, $b_{i+3}$) from the original minuends ($a_i$, $a_{i+1}$, $a_{i+2}$, $a_{i+3}$). However, there is a constant relationship between the simulated operation results and the true subtraction results. In this embodiment, a "distance table" like "Table 1" is prepared in advance, which shows a correspondence between the simulated operation results and the true subtraction results. In this table, a true subtraction result that corresponds to a simulated operation result k is stored in the k-th field (k is an integer of from 0 to 255). The method used for preparing the distance table will be described later.

TABLE 1

| |
|---|
| 0, 254, 252, 250, 248, 246, 244, 242, |
| 240, 238, 236, 234, 232, 230, 228, 226, |
| 224, 222, 220, 218, 216, 214, 212, 210, |
| 208, 206, 204, 202, 200, 198, 196, 194 |
| 192, 190, 188, 186, 184, 182, 180, 178, |
| 176, 174, 172, 170, 168, 166, 164, 162, |
| 160, 158, 156, 154, 152, 150, 148, 146, |
| 144, 142, 140, 138, 136, 134, 132, 130, |
| 128, 126, 124, 122, 120, 118, 116, 114, |
| 112, 110, 108, 106, 104, 102, 100, 98, |
| 96, 94, 92, 90, 88, 86, 84, 82, |
| 80, 78, 76, 74, 72, 70, 68, 66, |
| 64, 62, 60, 58, 56, 54, 52, 50, |
| 48, 46, 44, 42, 40, 38, 36, 34, |
| 32, 30, 28, 26, 24, 22, 20, 18, |
| 16, 14, 12, 10, 8, 6, 4, 2, |
| 0, 2, 4, 6, 8, 10, 12, 14, |
| 16, 18, 20, 22, 24, 26, 28, 30, |
| 32, 34, 36, 38, 40, 42, 44, 46, |
| 48, 50, 52, 54, 56, 58, 60, 62, |
| 64, 66, 68, 70, 72, 74, 76, 78, |
| 80, 82, 84, 86, 88, 90, 92, 94, |
| 96, 98, 100, 102, 104, 106, 108, 110, |
| 112, 114, 116, 118, 120, 122, 124, 126, |
| 128, 130, 132, 134, 136, 138, 140, 142, |
| 144, 146, 148, 150, 152, 154, 156, 158, |
| 160, 162, 164, 166, 168, 170, 172, 174, |
| 176, 178, 180, 182, 184, 186, 188, 190, |
| 192, 194, 196, 198, 200, 202, 204, 206, |
| 208, 210, 212, 214, 216, 218, 220, 222, |
| 224, 226, 228, 230, 232, 234, 236, 238, |
| 240, 242, 244, 246, 248, 250, 252, 254 |

At step S100, the distance table is referred to by using the values held in the registers x0, x1, x2 and x3 as indexes to access true subtraction results $d_0(=a_i-b_i)$, $d_1(=a_{i+1}-b_{i+1})$, $d_2$ $(=a_{i+2}-b_{i+2})$ and $d_3(=a_{i+3}-b_{i+3})$. In this case, the process at step S100 is described in C language as the following Expressions (2) through (5).

[Expression 2]

$$d_0 = \text{dist\_table}[x0] \quad (2)$$

[Expression 3]

$$d_2 = \text{dist\_table}[x1] \quad (3)$$

[Expression 4]

$$d_2 = \text{dist\_table}[x2] \quad (4)$$

[Expression 5]

$$d_3 = \text{dist\_table}[x3] \quad (5)$$

The "dist_table" is a distance table. The distance table is an array that in the C programming language, for example, is declared as "unsigned int dist_table [256]", which will be described later.

If the simulated operation result $c_0$ is 43, value 170 stored in the 43rd field in the distance table shown in [Table 1] is returned as the true subtraction result $d_0$. If the other operation results are $c_1=205$, $c_2=97$ $c_3=64$, true subtraction results $d_1=154$, $d_2=62$ and $d_3=128$ are extracted from the corresponding fields in the distance table. The results $d_0$, $d_1$ and $d_2$ are different by one from the results obtained by subtracting the original subtrahends from the original minuends, $a_i-b_i(=169)$, $a_{i+1}-b_{i+1}(=155)$ and $a_{i+2}-b_{i+2}(=63)$. This difference occurs because the least significant bits of the original minuends and subtrahends are deleted. It is confirmed according to an empirical rule that this difference little affects the vector distance calculation as a whole (it should be noted that this is apparent when this calculation is applied for the prediction of motion between frames by motion compensation).

At step S110, squared values of the extracted true subtraction results $d_0$, $d_1$, $d_2$ and $d_3$ are added to the squared distance SQD ($=|AB|^2$). This arithmetic operation is described in C language as "SQD=SQD+$(d_0)^2$+$(d_1)^2$+$(d_2)^2$+$(d_3)^2$".

At step S120, a check is performed to determine whether or not i+4 exceeds N. If i+4 does not exceed N, all the elements of the vector have not yet been calculated. Thus, i is incremented by four (step S130), program control returns to step S20, and the above process is repeated.

When i+4 is greater than N, all the elements of the vector have been calculated. Program control exits through "Yes" at the decision block and the routine is thereafter terminated. It would be easily understood that the result of the final calculation, SQD value, is equal to the square of the distance between vectors AB, which is represented by Expression (1).

When the vector distance calculation in FIG. 1 is employed for the prediction of motion between frames by motion compensation", one of the vectors, A($a_0$, $a_1$, . . . , $a_{254}$, $a_{255}$), is fixed and is calculated in advance as a preprocessing procedure. This can be moved outside the processing loop, and the number of instructions can be further reduced.

Figure 5:
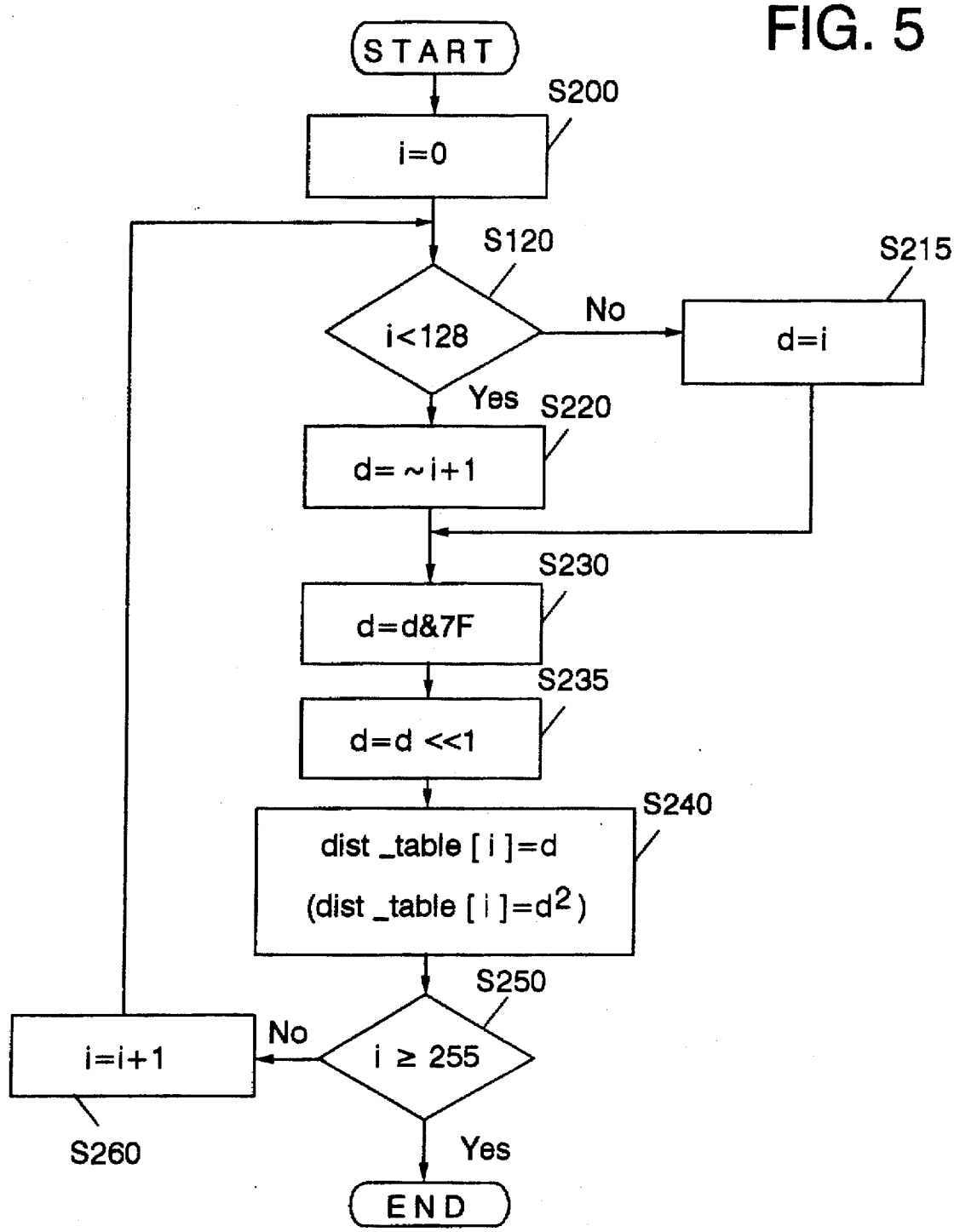
FIG. 5 is a flowchart showing an example for a method that is used for preparing a distance table.

FIG. 5 is a flowchart showing one example of a method used for preparing a distance table. In this flowchart, distance d is acquired by using a true subtraction result that corresponds to a simulated operation result i, and the true distance value d is written in the i-th field in the distance table (dist_table). This process will be described in detail.

First, at step S200, initial value 0 is substituted into index i. The index i corresponds to a suffix of "dist_table" in FIG. 1, i.e., the simulated operation results, $c_0, c_1, \ldots$, that are transmitted from the registers x0, x1, x2 and x3.

At step S210, a check is performed to determine whether or not the index i is less than 128.

The statement $i \geq 128$ means that the most significant bit of i in the binary system is ON, i.e., the eighth bit is set to 1. As is described above, a "1" is provided for the most significant bits of the simulated minuends $a'_i, a'_{i+1}, \ldots$ in order to prevent the borrowing of one from the next higher number. When this value, "1", remains at the most significant bit of the simulated operation result $c_i$, it indicates that the simulated minuend $a'_i$ is greater than the simulated subtrahend $b'_i$. In other words, the subtraction of $a'_i - b'_i (= c_i)$ was performed for only the lower seven bits without borrowing one from the next higher number. That is, the lower seven bits of the simulated result $c_i$ (i.e., i) equal the true subtraction result $a_i - b_i$ (it should be noted that the least significant bit is deleted). In this case, program control branches to "No" of the decision block S210, and at step S215, the index i is transmitted as subtraction result value d.

The statement $i \leq 127$ means that the most significant bit of i in the binary system is OFF (i.e., the eighth bit is set to 0). That is, the simulated minuend $a'_i$ is smaller than the simulated subtrahend $b'_i$, and the value of the most significant bit provided for the simulated minuend to prevent the borrowing of one from the next higher number, is lost as a result of the subtraction. Therefore, the simulated arithmetic operation, $a'_i - b'_i (= c_i)$ is performed by using the most significant bit to prevent the borrowing of one from the next higher number. As a result, the lower seven bits of the operation result $c_i (= i)$ merely represent the simulated subtraction result, and actually provides a negative value. However, what is required for the vector distance calculation is not a signed binary value, but an absolute value for a difference, $|a'_i - b'_i|$. Thus, program control branches to "Yes" at the decision block S210. And a negative value (i.e., a value for which the positive and negative are reversed) of the result $c_i (= i)$ is transmitted as the subtraction value result d. The extraction of the negative value is described in C language as "d=~i+1". The operator "~" (tilde) specifies an operation whereby the binary bit digits 0 and 1 are switched. Further, it is well known in the mathematical field that the negative value of i is acquired by the arithmetic operation ~i+1.

At step S230, the lower seven bits, which are substantial operation results, are extracted from the subtraction value d. The extraction, at step S230, of the lower seven bits from the binary value d of 8 bits is described in C language as "d=d & 7F". The operator "&" designates a logical product operation, and hexadecimal "7F" corresponds to "01111111" in the binary system. Therefore, the most significant bit can be masked with the logical product provided by "d & 7F". The procedures at step S215 and S230 can be described together as "d=i & 0 7F", and the procedures at steps S220 and S230 can be described together as "d=i|0 80" and "d=~d+1" (d is an 8 bit integer).

Since before subtraction is performed the minuend and the subtrahend are shifted one bit to the right, the absolute value of the subtraction result d is reduced to a half scale value. Therefore, at step S235, the contents of the registers are shifted one bit to the left to return to the original scale.

At step S240, the obtained true subtraction result d (a value reduced to seven bits) is written in the i-th field in the distance table. This writing process is performed by using the array "dist_table" and by employing the index i as an argument. In C language, for example, this process is described as "dist_table [i]=d". Since the subtraction result is to be squared later during the vector distance calculation (see step S110 in FIG. 1), the value d is not directly stored in the distance table. Instead, while taking the following process into consideration, it should be squared (d d) first, and the resultant value be stored thereafter[3].

At step S250, a check is performed to determine whether or not i has exceeded 255. If i is less than 255, the process for all the indexes has not yet been completed. At step S260, i is incremented by one, program control returns to step S210, and the above described process is repeated. When i has reached 255, the distance table has been prepared. Program control branches to "Yes" at decision block S250 and the process is thereafter terminated.

Through the process shown in FIG. 5, the "distance table" shown in Table 1 is prepared. This distance table is utilized at step S100 in FIG. 1, for example (previously mentioned).

In short, the arithmetic processing method according to the present invention increases the speed at which an enormous amount of repetitive subtractions can be performed, in exchange for reducing an 8-bit element to 7 bits. A result obtained by calculation may have an error as a tradeoff for the deletion of the least significant bit and the reduction in the accuracy. However, this method is very effective for a case wherein such an error can be disregarded (for example, vector distance calculation for motion compensation, and other cases which do not require that exact results be obtained by distance calculation).

In the drawings and specifications there has been set forth a preferred embodiment of the invention and, although specific terms are used, the description thus given uses terminology in a generic and descriptive sense only and not for purposes of limitation.

What is claimed is:

1. Method for performing arithmetic operation, including subtractions between data elements composed of unsigned k bits repeated at least N times, by using a logic unit that has one or more registers composed of k×m bit length (k, m and N are positive integers and $N \geq m$), comprising the steps of:

(a) writing m minuends to the respective k bits of a first register of said logic unit;

(b) shifting said first register one bit to a lower position;

(c) providing a "1" on the most significant bit position of the respective k bits of said first register;

(d) writing m subtrahends to the respective k bits of a second register of said logic unit;

(e) shifting said second register one bit to a lower position;

(f) providing a "0" on the least significant bit position of the respective k bits of said second register;

(g) subtracting contents of said second register, obtained at said step (f), from contents of said first register, obtained at said step (c), and writing the result into a third register of said logic unit;

(h) extracting said result by k bits from the upper portion of said third register obtained at said step (g); and (l) employing a value indicated by said k bits extracted at said step (h) as the address for referring to a table prepared in advance, and regarding said result obtained by referring to said table as a k-bit result obtained by subtracting one of the subtrahends from the corresponding minuends.

2. Method for performing arithmetic operation, including subtractions between data composed of unsigned 8 bits (=1 byte) that are repeated at least N times (N is a positive integer and N≧4), by using a logic unit that has one or more registers composed of 32 bit (=4 bytes) lengths, comprising the steps of:

(a) writing four minuends to the respective bytes of a first register of said logic unit;

(b) shifting said first register one bit to a lower position;

(c) providing a "1" on the most significant bit of the respective bytes of said first register;

(d) writing four subtrahends to the respective bytes of a second register of said logic unit;

(e) shifting said second register one bit to a lower position;

(f) providing a "0" for the least significant bit of the respective bytes of said second register;

(g) subtracting contents of said second register, obtained at said step (f), from contents of said first register, obtained at said step (c), and writing the result into a third register of said logic unit;

(h) extracting said result by one byte from the upper portion of said third register obtained at said step (g); and (I) employing a value indicated by said byte extracted at said step (h) as the address for referring to a table prepared in advance, and regarding said result obtained by referring to said table as a one byte result obtained by subtracting one of the subtrahends from the corresponding minuends.

3. Method for performing arithmetic operation, including subtractions between elements composed of unsigned 8 bits (=1 byte) that are repeated N times ($a_i - b_i$; i is a positive integer of 0 to N−1) (N is a positive integer and N≧4), by using a logic unit that has one or more registers composed of 32 bit (=4 bytes) lengths, comprising the steps of:

(a) writing four minuends, $a_i$, $a_{i+1}$, $a_{i+2}$ and $a_{i+3}$, to the respective bytes of a first register of said logic unit;

(b) shifting said first register one bit to a lower position;

(c) providing a "1" on the most significant bit of the respective bytes of said first register to acquire $a'_i$, $a'_{i+1}$, $a'_{i+2}$ and $a'_{i+3}$;

(d) writing four subtrahends, $b_i$, $b_{i+1}$, $b_{i+2}$ and $b_{i+3}$, to the respective bytes of a second register of said logic unit;

(e) shifting said second register one bit to a lower position;

(f) providing a "0" on the least significant bit of the respective bytes of said second register so that the resultant data $b'_i$, $b'_{i+1}$, $b'_{i+2}$ and $b'_{i+3}$ are stored in the respective bytes;

(g) subtracting contents, $b'_i$, $b'_{i+1}$, $b'_{i+2}$ and $b'_{i+3}$ of said second register, obtained at said step (f), from contents, $a'_i$, $a'_{i+1}$, $a'_{i+2}$ and $a'_{i+3}$, of said first register, obtained at said step (c), and writing a difference $c_j (= a'_{i+j} - b'_{i+j}$; j is a positive integer of 0 to 3) of the respective bytes into the respective bytes of a third register of said logic unit;

(h) extracting the result $c_j$ respectively from the upper portion of said third register; and (I) referring to a field addressed by said value $c_j$ in a table prepared in advance, so that a value stored in said field is employed as a result obtained by subtracting said subtrahend $b_{i+j}$ from said minuend $a_{i+j}$.

* * * * *